(12) United States Patent
Crane

(10) Patent No.: US 6,463,305 B1
(45) Date of Patent: Oct. 8, 2002

(54) POWER MANAGEMENT SYSTEM FOR CELLULAR TELEPHONES

(75) Inventor: John D. Crane, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/326,055

(22) Filed: Jun. 4, 1999

(51) Int. Cl.[7] ................................ H04B 1/38; H02J 7/00

(52) U.S. Cl. ....................... 455/566; 455/574; 455/343; 320/127

(58) Field of Search ................................ 455/566, 571, 455/572, 573, 574, 575, 90, 550, 343, 127; 320/107, 114, 127

(56) References Cited

U.S. PATENT DOCUMENTS

| | | | | | |
|---|---|---|---|---|---|
| 5,115,182 | A | * | 5/1992 | Ehmke et al. | 320/136 |
| 5,248,929 | A | * | 9/1993 | Burke | 320/127 |
| 5,648,717 | A | * | 7/1997 | Uskali | 324/428 |
| 6,236,214 | B1 | * | 5/2001 | Camp, Jr. et al. | 324/427 |

* cited by examiner

*Primary Examiner*—Edward F. Urban
*Assistant Examiner*—Erika A. Gary
(74) *Attorney, Agent, or Firm*—John D. Crane

(57) ABSTRACT

A cellular telephone power management system is described that can be actuated without the telephone becoming active for making or receiving calls. The management system provides the user with a useful indication of the power available in the telephone battery based on utilization since the last complete battery charge. Additionally, the available power indication is provided in a form which specifies available talk time and available standby time.

15 Claims, 1 Drawing Sheet

POWER MANAGEMENT SYSTEM FOR CELLULAR TELEPHONES

FIELD OF THE INVENTION

This invention relates broadly to the field of cellular telephones and particularly to the field of power management in cellular telephones.

BACKGROUND OF THE INVENTION

Cellular telephones have become increasingly common communications devices used by individuals to permit communication with others while the caller is away from his/her cable connected telephone. Cellular telephones permit callers to contact others while walking from one office to another, while shopping or driving. The convenience of utilizing a cellular phone is the primary attraction of this form of communications device.

Cellular telephones also offer advantages in under developed nations where the wire/fiber infrastructure for telephones has not yet been installed or, due to physical conditions locally, cannot be installed economically.

No matter where the user attempts to use a cellular telephone, the device is usually operative only if there is power available in the battery that powers the phone. Hence, the user is required to periodically charge the battery to insure that sufficient power is available to operate the phone for a period of time that is dependent on the type of use. Accordingly, cell phone manufacturers typically will provide guidelines to the user as to the extent of "talk time" and "standby time" available.

"Talk time" is the amount of time a user can talk on the phone and fully consume the power available in the battery. This is frequently an average time as the actual time typically will vary somewhat due to the conditions of use. For example, CDMA phones in particular are operated at varying transmitter power levels. Hence, a CDMA phone could be operated entirely within a cellular network at locations where the transmit power levels required were at the maximum. If this were the case, the available talk time would be less than would be achieved if the phone were operated entirely in a region where transmit power levels were at a very low level.

"Standby time" refers to the time that a cell phone can be operated in the "on" state where the phone is able to receive or originate a call so as to permit communication between another party and the cell phone user.

Manufacturer's typically provide ratings for maximum "talk time" and maximum "standby time". This data can be useful in comparing one cell phone with another or the capacity of different batteries for a given cell phone. However, it is not particularly useful after the phone has been used for a period of time in helping the user know how much power remains in the battery.

To overcome this issue, cell phone manufacturers usually provide some form of battery power indication. In some cases, the indicator takes the form of a bar graph depicting the power remaining in the battery. In other forms, an icon of a battery is shown which has bars inside, the number of bars being indicative of the amount of battery charge available. The difficulty with these forms of battery display is that they are frequently not very accurate and they do not really give the user any idea of whether the upcoming expected use of the phone can be achieved with the remaining battery power.

Another problem associated with the existing cell phone battery power available indicators is that they are generally unavailable to the user without the phone being activated and in the standby mode. Typically, the cell phone must be turned on and have completed the necessary communication with the cell phone service provider network before the battery life indicator becomes active and available to the user. Hence, a great deal of power is consumed from the battery by the registration process that occurs when a cell phone is powered on and thereafter becomes connected to the service provider network. In the event that the user is only attempting to determine the state of the battery, the power drain caused by registration is completely unnecessary. In addition, there is a cost to the cellular service network in that resources are allocated to the phone seeking to register which may not need to be allocated if the user powers off once the battery status is determined, a condition which occurs quite frequently.

OBJECTIVES OF THE INVENTION

In view of the above mentioned problems relating to battery power indicators in cell phones, it is a principal objective of the present invention to provide a battery power indicator that will provide a power available indicator to the user while minimizing the use of power from the phone itself.

It is a further objective of the present invention to provide a battery power indicator for a cell phone that will provide the user with more useful information as to the power available from the battery than is currently available.

It is another objective of the present invention to provide a battery power indicator for a cell phone that is available to the user and does not require the expendature of power and resources by a cellular network provider.

SUMMARY OF THE INVENTION

The above mentioned and other objects, advantages and features of the present invention are achieved by modification to typical cell phones. During the power on sequence that is activated when a cell phone is turned on, a test is performed to determine if a key, such as the # key, is depressed at the same time as the power on key. When this situation is detected, the cell phone executes a different power on sequence that results in activating the battery condition indicator. This indicator remains in the active state for a selected period of time and then the phone is turned off automatically thereby saving battery power and cellular network resources. The battery indicator of the present invention additionally provides the user with a better indication of the power available than the battery indicators frequently found in typical conventional cell phones. The present indicator provides a graphical representation of available power that easily translates into available talk and standby time.

BRIEF DESCRIPTION OF THE DRAWINGS

The above mentioned and other objects, advantages and features of the present invention are described below in connection with the attached drawings which from a part of the disclosure and wherein.

DETAILED DESCRIPTION

Figure 1:
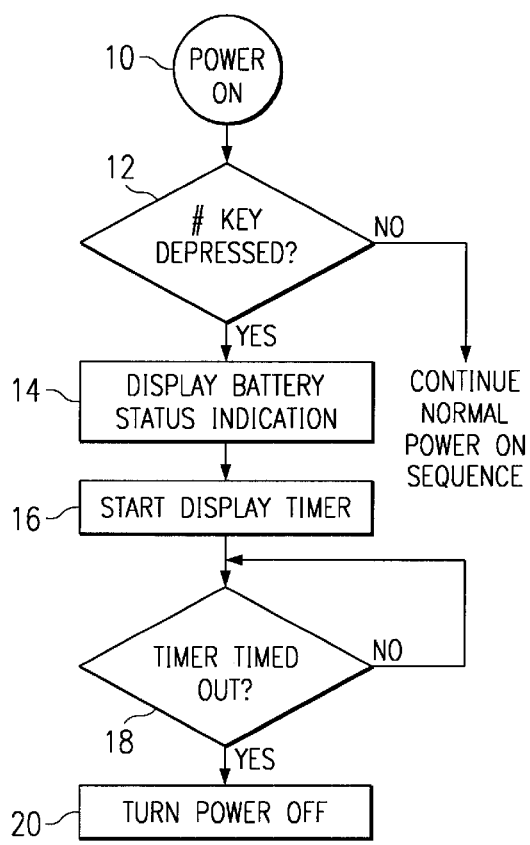
FIG. 1 illustrates the power on sequence executed by the cell phone of the present invention which saves battery power and cell phone network resources.

The cell phone power management system of the present invention is illustrated in part by the flow chart of FIG. 1. When the power of the cell phone is first turned on as illustrated at 10, the built in power on sequence in the cell phone software initiates a test as illustrated at 12 to determine if one or more cell phone keys have been depressed at the same time as the power on key. If one or more keys have not been depressed, the test at 12 is answered "No" and the power on sequence of the cell phone is returned to its normal power on sequence which causes the cell phone to attempt to register with a local service provider.

If the test at 12 is answered "Yes", then one or more keys were detected as being depressed at the same time as the power on key. The specific key or keys that must be depressed or other form of actuation (eg., voice activated input) is not critical and could be, for example, any of the typical keys on a cell phone or other actuation mechanism. The test could alternatively seek to determine if a specific key, such as the # key, has been depressed at the same time as the power on key. In any event, when one or more keys are depressed at the same time as the power on key, the control sequence of the cell phone causes the normal power on sequence to be broken and control passes to the step at 14 where the battery power indication is displayed on the cell phone. The exact nature of the battery display is not critical, however, it can be the typical display of conventional cell phones that can take on many forms including, but not limited to, a series of bars where the number of bars represents a measure of the battery power remaining, a plurality of dots or the like where the number of dots represents the voltage or power remaining, a graphical indication of remaining battery power or the like. The specific type of display that indicates the battery state is not of particular importance just now as truly any battery power display will suffice although a display of the type discussed below will provide the user with more usable information than displays typically available in cell phones currently on the market. For this aspect of the invention, it is merely important that a mechanism is provided to display the power available from the battery without actually having to have the cell phone attempt to log onto a cellular network.

Once the battery power indication is turned on at 14, the cell phone controller goes into a timer loop at 18 for a predetermined period of time. When that time period has elapsed, the timer is said to have timed out and the controller goes to the step at 20 where the cell phone is turned off. As the intent of the present invention is to provide the user with an indication of battery state without turning on the cell phone and without unnecessarily wasting battery power, the timer at 18 will typically be set in the range of 5 to 15 seconds permitting ample but not excessive time for the user to view the battery status indicator before power is turned off at step 20. It will also be recognized that the user may in fact turn the phone off himself after observing the battery power indication before the timer has timed out. The automatic turn off feature of the invention, however, prevents power from being unnecessarily consumed in the event the user fails to turn the phone off himself.

As mentioned above, there are many advantages to the invention just described. In particular, the user can obtain information regarding the state of the cell phone battery without having to connect to a service provider network. This will save battery. In addition, network resources are saved as well because the cell phone does not have to register with the service provider to simply determine the battery status.

Most cell phone users have experienced various problems with respect to the typically available battery power indicators. Such indicators frequently are not particularly helpful in determining just how much use can be made of the phone before the battery power is exhausted. In many instances, the user is provided with an indication that the battery is charged only to later have a call dropped due to lack of battery power. One of the reasons for this happening is due to the fact that the battery voltage/power indicator is observable by the user when the cell phone is in a low power drain state.

This will usually cause the voltage output of the battery to be much higher than when the battery is powering the transmitter in the cell phone. Hence, the typical battery voltage indication is very likely to give the user the false impression as to the state of the battery.

Figure 2:
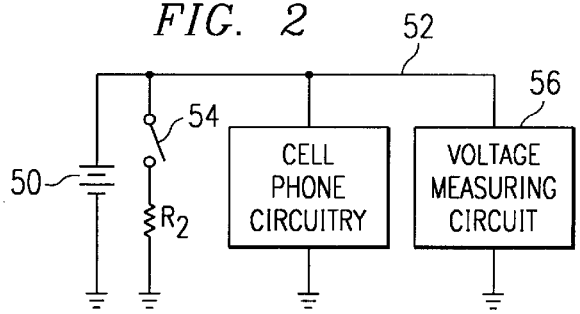
FIG. 2 illustrates a circuit utilized to assure that the conventional voltage indication of a conventional cell phone will be representative of the true voltage when the phone is in actual operation even though only the voltage indicator has been actuated.

FIG. 2 illustrates a circuit that is usable in a cell phone to permit more accurate display of the voltage of the battery in the cell phone. The cell phone battery 50 is coupled by a lead 52 to the cell phone circuitry. When the power on sequence of FIG. 1 is in the loop defined by step 18 where a timer is being checked, a switch 54 is closed to connect a load resistor $R_L$ across the battery 50. The resistance of the load resistor $R_L$ is selected to place a load current on the battery 50 which approximates that of the cell phone while the transmitter therein is communicating with a base station. This will load down the battery 50 and will result in the voltage measuring circuit 56 coupled thereto to give a more accurate reading. Because actuation of the switch 54 results in an added drain of the battery 50, the switch 52 is allowed to be in its closed state for only enough time for the user to observe the voltage indicator and then the cell phone is turned off to conserve battery power.

The above detailed description has concentrated on the features of the present invention relating to conserving cell phone battery power and network resource conservation for cell phone users who are merely attempting to determine the status of the battery in their phone. However, the typical battery power indicator which measures the battery voltage per se does not give the user a very complete picture of how much phone utilization is available from the power remaining in the battery. It is, therefore, a further aspect of the present invention to provide the user with a display that will provide the user with a better estimation of the activities (talk time or standby time) that the user can expect perform with the power remaining in the battery. A further feature of the improved battery power available display described below is that the battery does not have to be loaded down using the circuit illustrated in FIG. 2 in order to obtain an accurate assessment of the usable power available in the cell phone battery.

Figure 3:
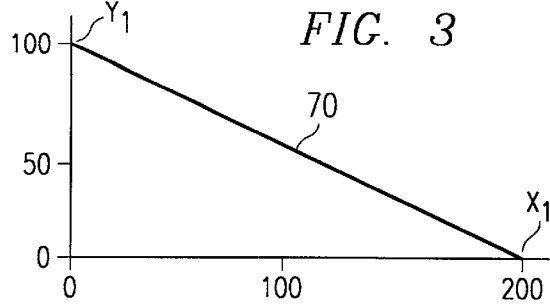
FIGS. 3–5 illustrates a graphical display of the power available in a cell phone in a fashion that informs the user of the available talk and standby time rather than the conventional illustration of battery voltage.

Reference is now made to FIG. 3 which generally illustrates a battery display having the capability of giving the user an estimate of the activities that can be performed and the time available for those activities. The vertical axis of the graph of FIG. 3 represents the talk time in minutes while the horizontal axis represents the standby time in hours. The curve 70 represents the utilization curve for a fully powered battery, for example. In the event that the battery were used only in standby mode waiting to receive a call, the battery life would be $X_1$ hours (about 200 hours for the graph shown). On the other hand, if the battery were used only for talking, the battery life would be $Y_1$ minutes (about 100 minutes for the graph shown). The numbers $X_1$ and $Y_1$, therefore, would correspond to the maximum standby time and the maximum talk time respectively available from the fully charged battery.

Figure 4:
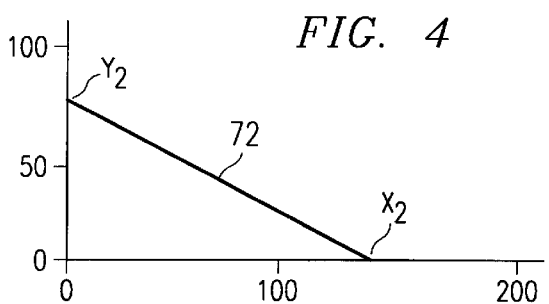

As the cell phone is used for talking and standby, the available battery energy goes down. In the illustration of FIG. 4, the curve 72 represents the power available for the hypothetical battery represented thereby where the maximum remaining talk time is $Y_2$ (about 75 minutes) and the maximum remaining standby time is $X_2$ (about 150 hours). Curves representing successively smaller power as the battery becomes more discharged can easily be developed.

When a battery display of the type illustrated in FIG. 3 is made available, the user would see a vertical axis which defines talk time while the horizontal axis represents standby time. Normally, it would be expected that talk time would be represented in minutes while standby time might be longer and represented in hours. In the typical user display, there would be a single curve such as 70 extending from the vertical to the horizontal axis.

Figure 5:
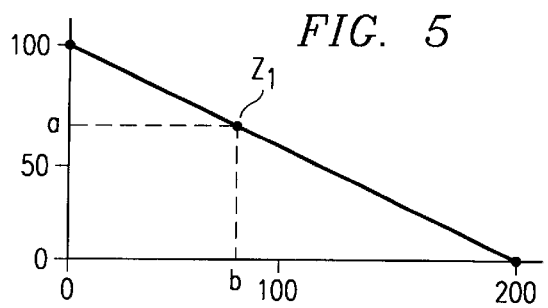

Another use of the graphical display proposed here can be demonstrated by comparing the meaning of point $Y_1$ in FIG. 3 with point $Z_1$ in FIG. 5. Both FIG. 3 and FIG. 5 contain a line 70 that represents a fully charged battery. As previously explained, pint $Y_1$ in FIG. 3 means that, if the user employs his cellular telephone sole for talk time, his battery will provide power for about 100 minutes. Point $Z_1$ in FIG. 5 has a slightly different meaning. Point $Z_1$ in FIG. 5 means that, if the user employs his cellular telephone for a fairly lengthy 75 minute telephone call (the 75 minute reading being ascertained from reference point a in FIG. 5), then the user will have only about 50 hours of standby time remaining (the 50 hour reading being ascertained from reference point b in FIG. 5). Thus the graphical display proposed here provides the cellular telephone user something he has never had before: a simultaneous, easily readable indication of both talk time and standby time remaining on his phone.

The curve of the type illustrated in FIGS. 3–5 would be displayed on the screen of a typical cell phone when the user desired to know how much utilization remained in the battery. The nature of these curves has simply been illustrated as straight lines but they may prove in actual implementation to be other than straight lines. Regardless of shape, the phone manufacturer can provide a table lookup that will make possible the display of the curve illustrated, for example, in FIG. 3 as a function of the activity occurring since the last complete battery charge. The software that controls the cell phone can keep track of the time the phone was used for talking and the time it was on standby. The design engineers can specify the average amount of battery energy consumed by talking and the average battery energy consumed by standby. Then, by knowing the total standby and talk time since the last complete battery charge, the cell phone software can simply subtract the power consumed by talking and standby from the power available to derive the remaining power available. From that, a table lookup can be generated to display a curve representing the available usage remaining in the battery.

An alternative method for determining available power is to have a power consumption measuring circuit in the phone. As the phone is used the consumed power is measured and subtracted from the power available in the battery when fully charged. The available power then can be represented by table lookup as a curve of the type illustrated in FIG. 3.

An alternative display is to display the total talk time and total standby time used since the last complete battery charge. With usage the user could become familiar with the characteristics of the phone and estimate the remaining battery life. Alternatively, the phone software could additionally display a table illustrating available usage alternatives. For example, the table could indicate for 10 minutes of talk time, the remaining standby time might be, for example, 18 hours. For 20 minutes of talk time, the remaining standby time might be 9 hours. From such a table, the user can quickly judge if the expected utilization of the cell phone can be achieved with the remaining available power in the battery.

While the description set forth above is directed to the invention as described herein and illustrated in the figures, those of skill in the art will recognize that numerous modifications in addition to those suggested above may be made without departing from he spirit and scope of the invention as defined by the following claims.

What is claimed is:

1. A mobile phone power management system for a mobile phone with a display, battery and key pad with a plurality of keys, the system comprising, in combination:
   a detector to detect the simultaneous depression of a power on key and another key on the mobile phone wherein said mobile phone does not become active as a wireless phone in response to said detector;
   a display circuit responsive to said detector for displaying on the display the status of the mobile phone battery.

2. The system of claim 1 wherein said battery status indication comprises a graphical representation of the mobile phone battery voltage.

3. The system of claim 2 additionally including a resistive load coupled to the mobile phone battery to simulate power drain on said battery when said mobile phone is in a power on state and communicating with a base station.

4. The system of claim 1 additionally including a resistive load coupled to the mobile phone battery to simulate power drain on said battery when said mobile phone is in a power on state and communicating with a base station.

5. The system of claim 1 wherein said battery status indication comprises an indication of talk time and standby time utilized since the last time said battery was charged.

6. The system of claim 5 wherein said battery status indication additionally comprises an indication of the remaining talk time and standby time available before said battery becomes discharged.

7. The system of claim 1 wherein said battery status indication comprises an indication of the remaining talk time and standby time available before said battery becomes discharged.

8. The system of claim 1 additionally including a timer circuit to turn the mobile phone off after having displayed said indication for a predetermined period of time.

9. A power management system for a mobile phone comprising, in combination:
   a battery within said mobile phone to provide electrical power thereto;
   a display in said phone;
   a display generator coupled to said display and powered by said battery to cause the display of a battery status representation of talk time and standby time remaining before said battery becomes discharged wherein the battery status representation is a graphical image plotting talk time available before battery discharge versus standby time.

10. The power management system of claim 9 including circuitry to display only said battery status representation without consuming power to activate coupling said mobile phone to a service provider.

11. The power management system of claim 10 including a timer to permit display of said battery status indication for a predetermined period of time after which the mobile phone is turned off.

12. The power management system of claim 9 including a timer to permit display of said battery status indication for a predetermined period of time after which the mobile phone is turned off.

13. The system of claim 9 additionally including a resistive load coupled to the battery to simulate power drain on said battery when said mobile phone is in a power on state and displaying the status of only the mobile phone battery.

14. The system of claim 9 wherein said display is actuated by depression of a power on key and a second key on the mobile phone and the mobile phone is actuated thereby to actuate said display.

15. The system of claim 14 wherein said display is actuated for a predetermined period of time and thereafter the phone is powered off.

* * * * *